Figure 2:
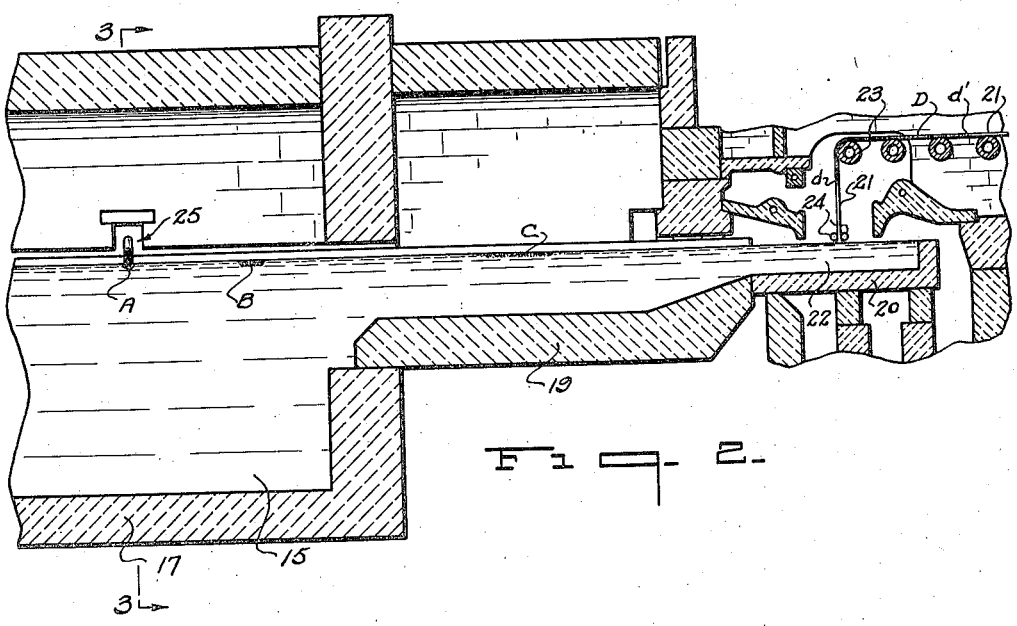

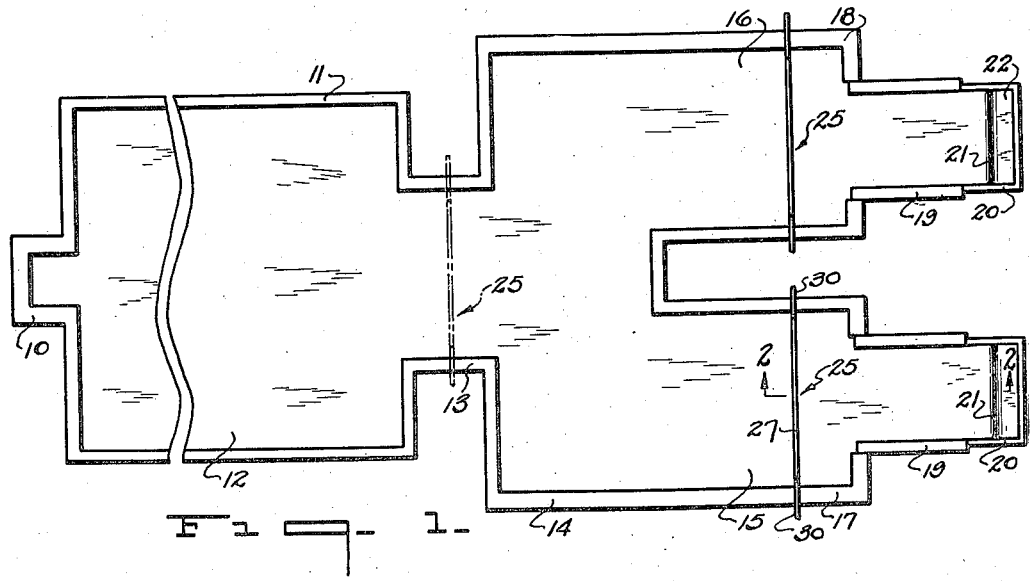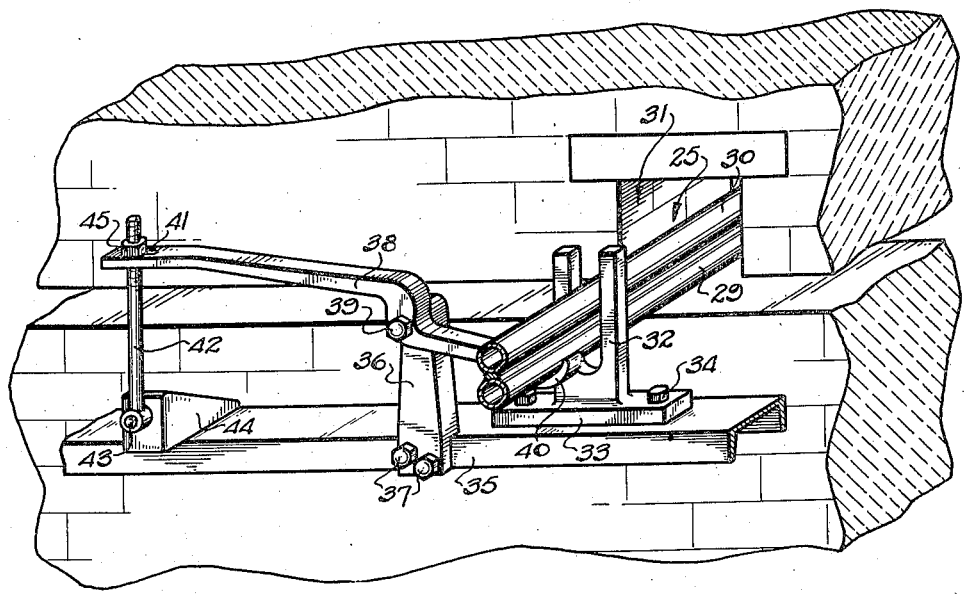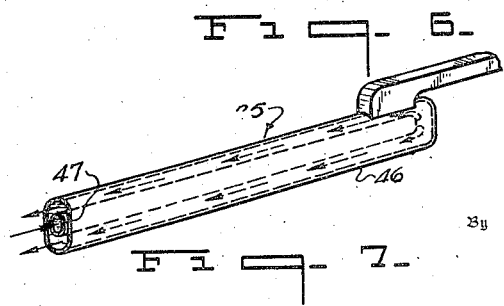

Aug. 4, 1936.                C. H. WRIGHT                    2,049,600
           METHOD AND APPARATUS FOR CONDITIONING MOLTEN GLASS
                       Filed July 21, 1933          2 Sheets-Sheet 2

Inventor
CHARLES H. WRIGHT.
By Frank Fraser
Attorney

Patented Aug. 4, 1936

2,049,600

UNITED STATES PATENT OFFICE 2,049,600

METHOD AND APPARATUS FOR CONDITIONING MOLTEN GLASS

Charles H. Wright, Shreveport, La., assignor to Libbey-Owens-Ford Glass Company, Toledo, Ohio, a corporation of Ohio Application July 21, 1933, Serial No. 681,463

9 Claims. (Cl. 49—54)

The present invention relates broadly to the art of producing sheet glass and more particularly to an improved method and apparatus for conditioning the molten glass for the sheet forming operation.

In the system of producing sheet glass as exemplified in the patent to Colburn, No. 1,248,809, granted December 4, 1917, a mass of molten glass is continuously produced in the melting end of a relatively long tank furnace and caused to flow slowly through the refining and cooling portions or chambers thereof into a relatively shallow working receptacle or draw-pot. A continuous sheet of glass is drawn upwardly from the surface of the pool of molten glass in the draw-pot and while still in a semi-plastic condition, although substantially set in its final sheet form, the said sheet is deflected into the horizontal plane about a rotatable bending member and passed horizontally into and through an annealing leer. The greater portion of the glass which is drawn upwardly in sheet form is taken from the surface of the molten pool and the greater portion of the flow of glass through the furnace is a surface flow, the lower strata of the glass in the tank having relatively slight movement.

During the process of reducing the glass making materials to a molten mass of glass and flowing the molten glass through the respective furnace chambers to the working receptacle, there collects upon the surface of this molten mass a certain amount of smear, scum, or other foreign matter which, if permitted to work its way up into the working receptacle and thence into the sheet being formed, will cause defects therein. In order to prevent this condition, it has heretofore been customary in tank furnaces of this general character to use so-called refractory floaters arranged transversely within the furnace and being immersed within the molten glass so as to retard the flow movement of the surface glass and prevent the impurities or foreign matter thereupon from passing through the furnace and working their way into the glass sheet.

The impurities or foreign matter collected or accumulated behind the floaters would then be removed at certain intervals, usually by the process of ladling. That is to say, an operator would introduce a ladle through an opening in the side wall of the furnace and skim off the upper surface of the molten glass so as to remove the impurities and foreign matter therefrom. The ladling out of the impurities in this manner is, however, attendant with certain limitations and disadvantages which arise from the fact that the introduction of the ladle not only tends to disturb and agitate the molten glass, but in addition a ladle cannot generally be introduced into molten glass without contaminating the same.

An important aim and object of this invention, therefore, consists in the provision of an improved method and apparatus for conditioning the molten glass within the furnace to the end that the glass passing into the sheet being formed will be of a better quality and substantially free of smear and other defects.

Another important aim and object of the invention resides in the provision of an improved method and apparatus for skimming the body or mass of molten glass as it flows through the furnace and for removing the surface defects or impurities that are collected or accumulated as a result of such skimming action.

Another object of the invention is the provision of a method and apparatus for skimming and conditioning the body or mass of molten glass as it flows through the furnace in a manner to retard and prevent the impurities and foreign matter present upon the surface thereof from flowing through the furnace and passing promiscuously into the glass sheet being formed.

A further object of the invention is the provision of a novel type of skimming device and method of handling the same whereby the foreign matter collected or accumulated by the action of the said skimming device will be caused to flow through the furnace in a body at desired intervals whereby they will be concentrated in a definite length or stretch of the sheet being formed instead of being scattered promiscuously throughout the same.

Other objects and advantages of the invention will become more apparent during the course of the following description when taken in connection with the accompanying drawings.

Figures 3, 4, 5:
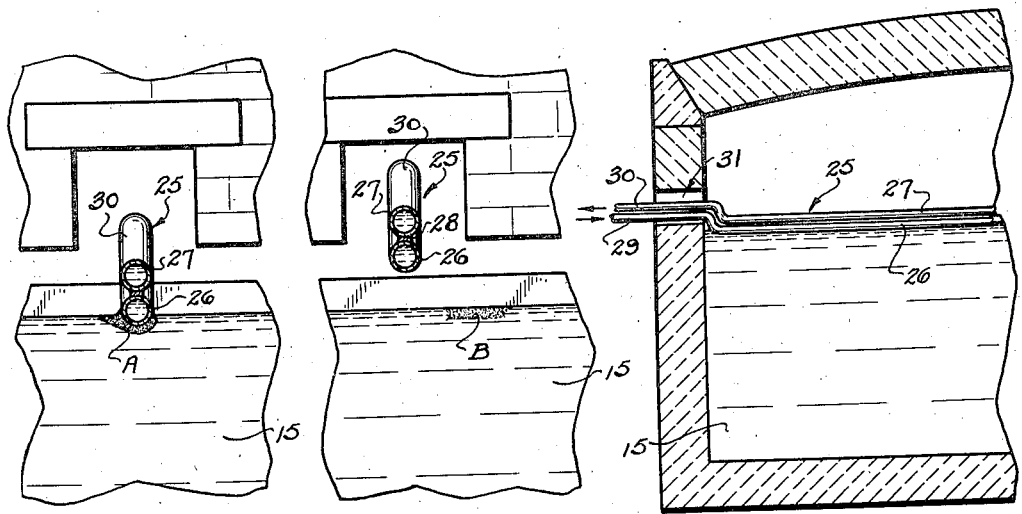

In the drawings wherein like numerals are employed to designate like parts throughout the same, Fig. 1 is a diagrammatic plan view of a glass melting furnace showing the skimming device provided by the present invention at preferred locations therein, Fig. 2 is a longitudinal sectional view taken substantially on line 2—2 of Fig. 1, Fig. 3 is a transverse vertical section taken substantially on line 3—3 of Fig. 2, Fig. 4 is a detail sectional view through a portion of the furnace showing the skimming device immersed in the molten glass, Fig. 5 is a similar view showing the skimming device in elevated position above the molten glass, Fig. 6 is a perspective elevation showing the means for supporting and adjusting one end of the skimming device, and Fig. 7 is a perspective sectional view of a different type of skimming device.

In the type of tank furnace illustrated diagrammatically in Fig. 1 of the drawings, the glass producing materials are introduced into the furnace at one end thereof through a so-called doghouse 10 and then melted in the substantially rectangular melting tank 11 to form a mass or body of molten glass 12. The molten glass flows slowly toward the right through a restricted opening or neck 13 into a refining chamber 14 wherein it is divided into two separate streams 15 and 16 and caused to flow through the spaced parallel channels 17 and 18 respectively. Connected to the forward end of each channel 17 and 18 is a relatively shallower and narrower cooling chamber 19 through which the molten glass flows into the working receptacle or draw-pot 20 which is preferably somewhat shallower than the cooling chamber.

The glass sheet 21 is drawn upwardly from the surface of the pool of molten glass 22 contained in working receptacle 20 and, while still in a semi-plastic condition, although substantially set in its final sheet form, the said sheet is deflected into the horizontal plane about a rotatable bending roll 23 and carried horizontally into and through an annealing leer (not shown). As is well known in the art, the continuous sheet or ribbon of glass emerges from the exit end of the annealing leer onto a so-called capping table upon which it is cut transversely into sections of the desired length. These sections are then transferred to the cutting room where they are inspected for defects and cut up into smaller lights. For the purpose of maintaining the sheet to width, suitable width maintaining means may be provided, and those here shown consist of a pair of relatively small rotatable knurled rollers 24 engaging opposite sides of the sheet at each edge thereof.

In the drawings, the novel and improved skimming device provided in accordance with the present invention is designated in its entirety by the numeral 25 and, as shown in Fig. 1, one of these skimming devices may be arranged within each of the channels 17 and 18, preferably slightly in advance of the respective cooling chamber 19 or, if desired, a single skimming device can be positioned within the neck 13. However, it is to be understood that the present invention is not limited to the use of the skimming device at any particular location in the furnace, although it is ordinarily desirable that it be arranged at a point in advance of the working receptacle 20. Furthermore, the invention is not restricted to use in connection with any particular type of glass melting furnace or with any specific sheet forming machine.

Referring particularly to Figs. 1 to 6, the skimming device 25 comprises a relatively small cylindrical metallic pipe 26 which is arranged transversely of the furnace and is adapted to be slightly immersed within the mass of molten glass in a manner to retard the flow movement of the surface glass and cause the surface impurities and defects to gather or accumulate in proximity thereto. Positioned directly above the pipe 26 and extending parallel therewith is a similar pipe 27, with the two pipes being preferably connected together at a plurality of spaced points throughout their length as indicated at 28 by welding or in some other suitable manner. The two pipes 26 and 27 are formed with the vertically offset end portions 29 and 39 respectively, which project outwardly through openings 31 formed in the side walls of the furnace.

The pipes 26 and 27 are in communication with one another at one end thereof, for example at the end to the right in Fig. 3, so that a suitable temperature control medium, such as water or the like, may be continuously circulated therethrough. This cooling medium is preferably, although not necessarily, introduced into the bottom pipe 26 from one end thereof and, after circulating through the pipes, is discharged from the upper pipe 27 at the same side of the furnace as indicated by the arrows in Fig. 3.

According to the invention, the skimming device 25 is adapted to be elevated periodically to a position above the surface of the mass of molten glass as shown in Fig. 5 so as not to retard the flow movement of the surface glass. Therefore, suitable means is provided at opposite sides of the furnace outwardly thereof for supporting the opposite ends of the skimming device and for effecting the desired vertical adjustment thereof. As shown in Fig. 6, the supporting and adjusting means at each side of the furnace comprises a vertical substantially U-shaped guide member 32 within which the adjacent end of the skimming device 25 is slidably received, said vertical guide member being carried by or formed integral with a horizontal base plate 33 secured by bolts or the like 34 to a stationary horizontal supporting beam 35 extending longitudinally of the furnace.

Also carried by the supporting beam 35 is a vertical standard 36 secured thereto by bolts or screws 37. The numeral 38 designates a supporting rocker arm or lever pivotally mounted intermediate its ends, as at 39, to the upper end of standard 36, said rocker arm being formed at one end with a hook or cradle portion 40 upon which the adjacent end of the skimming device is freely supported. The opposite end of the rocker arm 38 is provided with a slot 41 through which is loosely received the upper end of an adjusting bolt 42, said bolt being pivoted at its lower end as at 43 to a block 44 also carried by supporting beam 35. Threaded upon the upper end of the adjusting bolt 42 above rocker arm 38 is a nut 45.

From the above, it will be seen that upon rocking of the levers 38 at opposite sides of the furnace about their pivots 39, the skimming device can be adjusted vertically relative to the mass of molten glass. The skimming device can be maintained in the desired adjusted position upon tightening of the nuts 45 to engage the levers 38. Due to the fact that the supporting and adjusting means described above is arranged at each side of the furnace, there is provided means for independently adjusting the opposite ends of the skimming device vertically to vary the depth of immersion of the pipe 26 within the molten glass and for also elevating the same to a position entirely above the molten glass when desired. It is also possible for one end of the skimming device to be dipped down into the molten glass to a slightly greater depth than the opposite end thereof should it be found desirable, under certain operating conditions, to cool the glass stream adjacent one side of the furnace to a slightly greater degree than adjacent the opposite side thereof.

Under normal operating conditions, the skimming device 25 is maintained in a position where the pipe 26 will be slightly immersed within the mass of molten glass, as shown in Fig. 4, and when in such position, the said pipe will of course function to retard the flow movement of the surface glass through the furnace. The retarding of the surface glass in this manner, coupled with the localized cooling action of the skimming device upon the glass, will cause the foreign matter and impurities which, as pointed out above, are ordinarily present upon the surface of the mass of molten glass, to gather or accumulate adjacent the said skimming device as indicated at A, and will in this manner be prevented from passing through the furnace into the working receptacle and thence into the sheet being formed.

As set forth hereinabove, it has heretofore been customary in the glass art to use refractory floater members arranged transversely within the furnace and immersed within the molten glass therein to retard the flow movement of the surface glass and prevent the impurities and foreign matter present thereupon from passing through the furnace and into the glass sheet. The impurities and foreign matter collected or accumulated behind the floater members were then removed at certain intervals, usually by skimming off the surface glass with the aid of a metal ladle. However, the ladling out of the impurities is attendant with certain objectionable features as noted above so that, in accordance with the present invention, there is provided a novel and improved method of removing the surface impurities which collect in proximity to the skimming device whereby the use of ladles for skimming the glass may be completely eliminated.

In carrying the invention into practice, the skimming device 25 is adapted to be periodically raised at desired intervals to a position above the surface of the mass of molten glass (Fig. 5) and when in this position, it will be apparent that the flow movement of the surface glass will be unobstructed, as a result of which the surface impurities which have gathered or accumulated in proximity to the pipe 26, as indicated at A, will be released and permitted to flush through the furnace in a body as shown at B (Figs. 2 and 5). The released body of impurities A flows on through the furnace and as it becomes heated by the glass, the impurities tend to spread out somewhat as indicated at C (Fig. 2). Upon continued movement, the impurities will finally pass into the working receptacle 20 and be drawn upwardly into the glass sheet 21 as indicated at D (Fig. 2).

As stated above, the greater portion of the glass which is drawn upwardly in sheet form is taken from the surface of the molten pool of glass 22 in the working receptacle and also the greater portion of the flow of glass through the furnace is a surface flow, the lower strata of the glass in the tank having relatively slight movement. By drawing the impurities and foreign matter upwardly into the glass sheet in this manner, they will be concentrated in a definite length or stretch of the glass sheet being formed instead of being scattered promiscuously throughout the same. As illustrated in Fig. 2, the impurities are shown as being concentrated in the glass sheet from points $d$ to $d'$, and when this portion of the continuous sheet emerges from the annealing leer, it will be cut out and thrown away.

After the skimming device has been raised above the molten glass and the body of accumulated impurities released, the said skimming device is again immediately lowered into position within the molten glass. A certan amount of the impurities will naturally adhere to the pipe 26 so that at intervals the skimming device may be entirely removed from the furnace and cleaned of any glass or impurities adherent thereto.

From the above, it will be apparent that the surface impurities and foreign matter collected or accumulated by the action of the skimming device are removed from the furnace in a novel and efficient manner. Although this method of removing the surface impurities will naturally result in the waste of some glass, yet the advantages to be gained by the practice of such a method have been found to more than offset the slight waste which occurs. It is the usual practice to raise the skimming device on an average of once every twenty-four hours to flush out the accumulated impurities, and ordinarily only about three to six lineal feet of glass is lost at each raising.

Such a skimming device and method of handling the same, as provided by the present invention, is now being actually used in the commercial production of sheet glass, and it has been found that the glass sheet (except of course during those periods when the surface impurities are being removed) is of a greatly improved quality, relatively free from smear and other defects. It has been found that the action of the skimming member effectively prevents the major portion of the surface impurities from passing through the furnace and being scattered promiscuously throughout the sheet being formed. Although the skimming device may not function to retard absolutely all of the surface impurities, yet the relatively small amount which are drawn or forced under the skimmer will not adversely affect the glass, since in being forced under the surface of the body of glass, the smear or scum is necessarily diffused into the main body of the glass to such an extent as to become practically homogeneous therewith and therefore does not appear in the finished glass as a defect.

The present invention is also not limited to the use of any specific type of skimming device. For instance, instead of the form of skimmer disclosed in Figs. 1 to 6, a skimmer such as in Fig. 7 may be employed. This skimming device is also designated in its entirety by the numeral 25 and comprises briefly an outer flattened pipe 46 and a relatively smaller inner flattened pipe 47. The cooling medium, such as water or the like, is preferably introduced into one end of the smaller pipe 47 and discharged from the opposite end thereof into the outer pipe 46, the water then flowing through the outer pipe in the opposite direction and in surrounding relation to the inner pipe as indicated by the arrows.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In the manufacture of sheet glass wherein a mass of molten glass is first established in the melting end of a tank furnace and then caused to flow through the refining and cooling portions of said furnace into the working zone from which the sheet is formed, the method consisting in retarding the flow movement of the surface glass within the furnace at a point in advance of the working zone to cause the impurities present upon the surface of the mass of molten glass to gather or accumulate in proximity to such point, and in periodically releasing the accumulated surface impurities and causing them to flow in a body through the furnace into the working zone and thence into the sheet being formed whereby they will be concentrated in a definite length or stretch of the said sheet.

2. In the manufacture of sheet glass wherein a mass of molten glass is first established in the melting end of a tank furnace and then caused to flow through the refining and cooling portions of said furnace into the working zone from which the sheet is formed, the method consisting in effecting a localized cooling of the surface glass within the furnace at a point in advance of the working zone to cause the impurities present upon the surface of the mass of molten glass to gather or collect in proximity to such point, and in periodically releasing the accumulated surface impurities and causing them to flow in a body through the furnace into the working zone and thence into the sheet being formed whereby they will be concentrated in a definite length or stretch of the said sheet.

3. In the manufacture of sheet glass wherein a mass of molten glass is first established in the melting end of a tank furnace and then caused to flow through the refining and cooling portions of said furnace into the working zone from which the sheet is formed, the method consisting in retarding the flow movement of the surface glass within the furnace at a point in advance of the working zone by mechanical means immersed within the said glass whereby to cause the impurities present upon the surface of the mass of molten glass to gather or accumulate in proximity to said mechanical means, and in periodically raising said mechanical means to a position above the molten mass of glass to release the accumulated impurities and cause them to flow in a body through the furnace into the working zone and thence into the sheet being formed so that they will be concentrated in a definite length or stretch of the said sheet.

4. In the manufacture of sheet glass wherein a mass of molten glass is first established in the melting end of a tank furnace and then caused to flow through the refining and cooling portions of said furnace into the working zone from which the sheet is formed, the method consisting in retarding the flow movement of the surface glass within the furnace at a point in advance of the working zone by mechanical means immersed within the said glass whereby to cause the impurities present upon the surface of the mass of molten glass to gather or accumulate in proximity to said mechanical means, in also effecting a localized cooling of the surface glass at the point of retardation thereof, and in periodically raising said mechanical means to a position above the molten mass of glass to release the accumulated impurities and cause them to flow in a body through the furnace into the working zone and thence into the sheet being formed so that they will be concentrated in a definite length or stretch of the said sheet.

5. In the manufacture of sheet glass wherein a mass of molten glass is first established in the melting end of a tank furnace and then caused to flow through the refining and cooling portions of said furnace into the working zone from which the sheet is formed, the method consisting in immersing within the molten glass in said furnace at a point in advance of the working zone a stationary metallic surface which acts to retard the flow movement of the surface glass and cause the gathering or accumulation of the impurities or defects present thereupon, in cooling said surface to effect a localized cooling of the surface glass in proximity thereto, and in periodically raising said surface to a position above the molten mass of glass to release the accumulated impurities and cause them to flow in a body through the furnace into the working zone and thence into the sheet being formed so that they will be concentrated in a definite length or stretch of the said sheet.

6. The combination with a glass melting furnace containing a body of molten glass and through which the said glass flows in a predetermined direction, of a skimming device immersed in the body of molten glass for retarding the flow movement of the surface glass and for causing the impurities present thereupon to gather or accumulate in proximity thereto, and means for movably supporting said skimming device and by means of which the said skimming device may be moved periodically vertically to a position above the body of molten glass to release the accumulated impurities and cause them to flow in a body through the furnace to the point of removal.

7. The combination with a glass melting furnace containing a body of molten glass and through which the said glass flows in a predetermined direction, of a skimming device immersed in the body of molten glass for retarding the flow movement of the surface glass, means for internally cooling said skimming device to effect a localized cooling of the surface glass and cause the impurities present thereupon to gather or accumulate in proximity thereto, and means for movably supporting said skimming device and by means of which the said skimming device may be moved periodically vertically to a position above the body of molten glass to release the accumulated impurities and cause them to flow in a body through the furnace to the point of removal.

8. The combination with a glass melting furnace containing a body of molten glass and through which the said glass flows in a predetermined direction, of a skimming device immersed in the body of molten glass for retarding the flow movement of the surface glass and for causing the impurities present thereupon to gather or accumulate in proximity thereto, and means for movably supporting said skimming device and by means of which the opposite ends thereof may be independently adjusted vertically to vary the depth of immersion of the said skimming device within the molten glass and also by means of which the skimming device may be periodically elevated to a position above the surface of the body of molten glass to release the accumulated impurities and cause them to flow in a body through the furnace to the point of removal.

9. The combination with a glass melting furnace containing a body of molten glass and through which the said glass flows in a predetermined direction, of a skimming device comprising a cylindrical metallic member immersed in the molten glass for retarding the flow movement of the surface glass, means for circulating a cooling fluid through said member to effect a localized cooling of the surface glass so as to cause the impurities present thereupon to gather or accumulate in proximity thereto, and means for movably supporting said member and by means of which the said member may be moved periodically vertically to a position above the surface of the body of molten glass to release the accumulated impurities and cause them to flow in a body through the furnace to the point of removal.

CHARLES H. WRIGHT.